United States Patent
Takahashi et al.

(10) Patent No.: US 9,691,534 B2
(45) Date of Patent: Jun. 27, 2017

(54) MAGNETIZATION DEVICE FOR MAGNETIC ENCODER

(71) Applicant: NTN CORPORATION, Osaka (JP)

(72) Inventors: Toru Takahashi, Iwata (JP); Shintarou Ueno, Azumino (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/421,096

(22) PCT Filed: Aug. 6, 2013

(86) PCT No.: PCT/JP2013/071197
§ 371 (c)(1),
(2) Date: Feb. 11, 2015

(87) PCT Pub. No.: WO2014/027584
PCT Pub. Date: Feb. 20, 2014

(65) Prior Publication Data
US 2015/0243427 A1 Aug. 27, 2015

(30) Foreign Application Priority Data

Aug. 16, 2012 (JP) .................................. 2012-180392

(51) Int. Cl.
*H01F 7/20* (2006.01)
*H01F 13/00* (2006.01)
*G01D 5/245* (2006.01)

(52) U.S. Cl.
CPC ......... *H01F 13/003* (2013.01); *G01D 5/2451* (2013.01)

(58) Field of Classification Search
CPC ... H01F 7/00; H01F 7/20; H01F 13/00; G01B 7/30; G01D 5/244; G01D 5/245
(Continued)

(56) References Cited

U.S. PATENT DOCUMENTS

| 6,294,910 B1 | 9/2001 | Travostino et al. |
| 6,700,367 B1 | 3/2004 | Santos et al. |

(Continued)

FOREIGN PATENT DOCUMENTS

| CN | 1871500 A | 11/2006 |
| CN | 1957231 A | 5/2007 |

(Continued)

OTHER PUBLICATIONS

Japanese Notification for Reason(s) for Rejection dated May 10, 2016 in corresponding Japanese Patent Application No. 2012-180392.

(Continued)

*Primary Examiner* — Shawki S Ismail
*Assistant Examiner* — Lisa Homza

(57) ABSTRACT

In a magnetization device, while an annular magnetic body including plural rows of annular un-magnetized magnetic encoder tracks which are arranged adjacent to each other and integrated therewith is rotated, magnetization is performed, thereby providing a magnetic encoder. The magnetization device includes: a magnetizing yoke including a pair of opposed end portions opposed to each other across a magnetic gap; an exciting coil wound on the magnetizing yoke; a magnetization power source supplying a magnetizing current to the exciting coil to pass magnetic flux between the opposed end portions; and a magnetic shield which is provided to the magnetizing yoke and shields flow of the magnetic flux to the rows of magnetic encoder tracks other than a magnetization target.

10 Claims, 15 Drawing Sheets

(58) Field of Classification Search
USPC .......................................................... 335/284
See application file for complete search history.

(56) References Cited

U.S. PATENT DOCUMENTS

| | | | |
|---|---|---|---|
| 7,508,193 B2 | 3/2009 | Yarimizu et al. | |
| 7,586,283 B2 | 9/2009 | Kabashima et al. | |
| 7,923,993 B2 | 4/2011 | Takahashi et al. | |
| 8,436,705 B2 | 5/2013 | Takahashi et al. | |
| 9,250,102 B2 | 2/2016 | Takahashi et al. | |
| 2004/0239311 A1 | 12/2004 | Santos et al. | |
| 2007/0164733 A1* | 7/2007 | Kabashima | G01D 5/145 324/207.25 |
| 2007/0182406 A1* | 8/2007 | Yarimizu | G01D 5/2457 324/207.25 |
| 2009/0315544 A1* | 12/2009 | Takahashi | F16C 41/007 324/207.25 |
| 2010/0225309 A1* | 9/2010 | Takahashi | G01D 5/145 324/207.25 |
| 2011/0158570 A1* | 6/2011 | Takahashi | F16C 41/007 384/446 |
| 2011/0291780 A1* | 12/2011 | Takahashi | G01D 5/2451 335/284 |
| 2012/0105055 A1* | 5/2012 | Takahashi | F16C 41/007 324/207.25 |
| 2013/0063138 A1* | 3/2013 | Takahashi | G01D 5/2451 324/207.25 |
| 2015/0243427 A1* | 8/2015 | Takahashi | H01F 13/00 335/284 |

FOREIGN PATENT DOCUMENTS

| | | |
|---|---|---|
| JP | 64-53512 | 3/1989 |
| JP | 6-58766 | 3/1994 |
| JP | 2001-518608 | 10/2001 |
| JP | 2002-541485 | 12/2002 |
| JP | 2003-59718 | 2/2003 |
| JP | 4024472 | 10/2007 |
| JP | 2008-233069 | 10/2008 |
| JP | 2010-186794 | 8/2010 |
| JP | 2011-252826 | 12/2011 |

OTHER PUBLICATIONS

Japanese Decision of Grant dated Jun. 28, 2016 in corresponding Japanese Patent Application No. 2012-180392.
Chinese Office Action dated Feb. 26, 2016 in corresponding Chinese Patent Application No. 201380042816.4.
Extended and Supplementary European Search Report dated Mar. 15, 2016 in corresponding European Patent Application No. 13879341.9.
PCT International Preliminary Report on Patentability mailed Feb. 26, 2015 in corresponding International Patent Application No. PCT/JP2013/071197.
PCT International Search Report mailed on Sep. 17, 2013 in corresponding International Patent Application No. PCT/JP2013/071197.
Chinese Office Action dated Dec. 8, 2016 from Chinese Patent Application No. 201380042816.4, 7 pages.

* cited by examiner

ROTATION DIRECTION

ROTATION DIRECTION

W>L

W<L

MAGNETIZATION DEVICE FOR MAGNETIC ENCODER

CROSS REFERENCE TO THE RELATED APPLICATION

This application is a U.S. National Stage Application, which claims the benefit under 35 U.S.C. §371 of PCT International Patent Application No. PCT/JP2013/071197, filed Aug. 6, 2013, which is based on and claims the foreign priority benefit under 35 U.S.C. §119 of Japanese Patent Application No. 2012-180392, filed Aug. 16, 2012, the entire disclosures of which are herein incorporated by reference as a part of this application.

BACKGROUND OF THE INVENTION

Field of the Invention

The present invention relates to a magnetization device for a magnetic encoder used for detecting rotation and rotation angles of various devices, and is particularly applied to a rotation detection device used for controlling rotation of various motors.

Description of Related Art

Regarding the technical field of bearing elements, a technology is disclosed in which magnetic sensors arranged in a line are used to obtain interpolated pulse signals (Patent Documents 1 and 2). A technology is disclosed in which a plurality of magnetic sensors and a magnetic drum having a plurality of magnetic tracks with different numbers of magnetic pole pairs per one rotation are used to calculate absolute angles (Patent Document 3). An angle detection device is disclosed which uses magnetic sensors as described above in Patent Documents 1 and 2 to detect an absolute angle on the basis of a phase difference between two different magnetic encoders (Patent Document 4).

A technology is disclosed which manufactures a magnetic encoder which is magnetized with multiple magnetic poles (Patent Document 5).

RELATED DOCUMENT

Patent Document

[Patent Document 1] Japanese Translation of PCT International Application Publication No. 2001-518608
[Patent Document 2] Japanese Translation of PCT International Application Publication No. 2002-541485
[Patent Document 3] JP Laid-open Patent Publication No. H06-058766
[Patent Document 4] JP Laid-open Patent Publication No. 2008-233069
[Patent Document 5] JP Patent No. 4024472
[Patent Document 6] JP Laid-Open Patent Publication No. 2010-186794

In the case where a plural-row magnetic encoder is used in order to realize a rotation sensor or an angle sensor for controlling a rotational device, the interval between a plurality of magnetic tracks is made as small as possible, and the sensor has to be arranged such that a safe air gap between the sensor and magnetic tracks is ensured. In particular, in order to make a device compact, it is desired to make an arrangement space for the sensor as small as possible, and thus a magnetic encoder is required in which plural rows of tracks are formed within a narrow width of about 2 mm to 10 mm. However, due to constraints such as mechanical tolerances and operating environment conditions, it is difficult to narrow the gap between a surface of the magnetic encoder and the sensor, and it is necessary to incorporate the magnetic encoder with an air gap of about 0.3 mm to 4 mm being ensured therebetween. In addition, since a magnetic force is the strongest in the vicinity of the center of the width of each track across the rotation direction thereof, the sensor is preferably arranged in the vicinity of the center of each track. In order to accurately read magnetic signals in this situation, magnetic patterns formed on the plural rows of magnetic tracks need to be formed with possibly clearest boundaries without influencing each other.

FIGS. 16A to 16C show a plurality of examples of a magnetic encoder including two rows of magnetic encoder tracks integrated therewith, and are used in Patent Document 4. In the case where the magnetic encoder described in Patent Document 4 is realized with separate magnetic tracks, if each axis is offset or shifted, or deformed during a step of assembling the magnetic encoder, the accuracy of magnetization is deteriorated. In particular, this influence is great in the case where the magnetic encoder is assembled after magnetization. In addition, it is difficult to match the phases of signals from respective magnetic encoder tracks, and thus it is necessary to perform a phase adjustment step on an operational circuit for absolute angle detection or to set a correction value for a phase shift.

FIGS. 17A and 17B show a magnetization device disclosed in Patent Document 5. In the case where the plural rows of adjacent tracks disclosed in Patent Document 4 are magnetized by using the magnetization device 50 in Patent Document 5, there arise the following problems. Leakage magnetic flux from a magnetizing yoke deteriorates the accuracy of magnetization of another track, and thus the accuracy of magnetization of adjacent portions of the tracks adjacent to each other is deteriorated. That is, as shown in FIG. 18A, in the case of initially magnetizing a Ch1 track 51 with a pole pair number M, leakage magnetic flux also flows to a Ch2 track 52 side. Thus, a portion in Ch2 track 52 shown by diagonal lines in FIG. 18A, the Ch2 track 52 is slightly magnetized with the pole pair number M. In particular, the Ch2 track 52 is easily influenced in the vicinity of a "b" portion thereof near the Ch1 track 51 by the leakage magnetic flux.

Next, as shown in FIG. 18B, in the case of magnetizing the Ch2 track 52 with a pole pair number N (N≠M), the Ch2 track 52 is magnetized with the pole pair number N. However, the vicinity of an "a" portion magnetized with the pole pair number M is magnetized with the pole pair number N in an overlapping manner. Similarly, also in the vicinity of the "a" portion near the Ch2 track 52, a magnetization state with the pole pair number M and a magnetization state with the pole pair number N are mixed with each other. Therefore, there is the problem that the accuracy of magnetization of adjacent portions of the tracks 51 and 52 adjacent to each other is deteriorated.

As a countermeasure against this, the applicant of this application has proposed a technology in which, as shown in FIG. 19, of the plural rows of magnetic encoder tracks 51 and 52 described in Patent Document 4, the one track 51 is magnetized while the other track 52 is covered with a magnetic ring 53 (Patent Document 6). In this case, it is possible to reduce leakage magnetic flux which flows to the track 52 covered with the magnetic ring 53, but an operation of attaching and detaching the magnetic ring 53 is cumbersome and thus becomes a wasted step. In the case of magnetizing the two rows of the tracks 51 and 52 shown in FIGS. 16A to 16C by using the magnetization device of Patent Document 5, each track requires the magnetization step, and thus it takes twice as much time for the magnetization, resulting in poor production efficiency.

SUMMARY OF THE INVENTION

An object of the present invention is to provide a magnetization device for a magnetic encoder which magnetization device allows each of plural rows of magnetic encoder tracks arranged adjacent to each other to be accurately magnetized without influencing the adjacent magnetic encoder track and allows reduction of wasted steps. In addition, an object of the present invention is to realize a plural-row magnetic encoder which includes magnetic encoder tracks each formed accurately by performing such magnetization and having a track width reduced to the minimum.

A magnetization device for a magnetic encoder according to the present invention is a magnetization device in which while an annular magnetic body including plural rows of annular un-magnetized magnetic encoder tracks which are arranged adjacent to each other and integrated therewith is rotated, portions of each magnetic encoder track in a circumferential direction thereof are magnetized one by one, thereby providing the magnetic encoder in which magnetic patterns different from each other are formed in the respective magnetic encoder tracks. The magnetization device includes: a magnetizing yoke including a pair of opposed end portions magnetically opposed to each other across a magnetic gap, the magnetizing yoke being configured to magnetize the magnetic encoder track of the magnetic encoder which magnetic encoder track is disposed at a determined position and in a determined attitude with respect to these opposed end portions; an exciting coil wound on the magnetizing yoke and configured to pass magnetic flux between the opposed end portions when power is supplied thereto; and a magnetic shield provided to the magnetizing yoke and configured to shield flow of the magnetic flux to the rows of magnetic encoder tracks other than a magnetization target.

A term "track arrangement direction perpendicular to the rotation direction" to be used hereinafter refers to a direction parallel to the axial direction of a rotation axis of the magnetic encoder, or a direction perpendicular to the axial direction of the rotation axis of the magnetic encoder. Although a magnetic field intensity detected by a sensor is changed depending on dimension of an air gap, when the track width W of each magnetic encoder track is set to a determined value (e.g., not smaller than 1 mm and less than 5 mm), it is possible to detect a magnetic signal of each magnetic encoder track respectively.

In this configuration, the opposed end portions of the magnetizing yoke are disposed with respect to the plural rows of un-magnetized magnetic encoder tracks. At that time, since the magnetic shield is provided to the magnetizing yoke, the magnetic shield is simultaneously disposed at a predetermined position with respect to the magnetic encoder tracks. By supplying the magnetizing current from the magnetization power source to the exciting coil, the magnetic flux is passed between the opposed end portions. By passing the magnetic flux between the opposed end portions while rotating the annular magnetic body, the row of magnetic encoder track that is a desired magnetization target is magnetized. At that time, the magnetic shield shields leak of the magnetic flux to the rows of magnetic encoder tracks other than the magnetization target.

Thus, the magnetic shield allows the magnetic encoder track that is the magnetization target to be accurately magnetized without influencing the adjacent magnetic encoder track. In this case, each time the magnetization step is performed, magnetization of the magnetic encoder track can be performed without requiring an operation of attaching and detaching the magnetic shield or the like, and thus it is possible to reduce the steps for magnetization.

In addition, in the case where the magnetic encoder and a magnetic sensor are combined, a sufficient air gap is required between the magnetic encoder and the magnetic sensor, and thus it is necessary to form magnetic poles with sufficient sizes and ensure a sufficient magnetic force. By the above magnetization, the magnetic encoder tracks adjacent to each other can be as close to each other as possible, and magnetic patterns magnetized accurately with sufficient intensities can be formed.

The plural rows of magnetic encoder tracks may be arranged in the direction parallel to the axial direction of the rotation axis of the magnetic encoder. That is, when the plural rows of magnetic encoder tracks are arranged coaxially and have the track width W within the above identified range, it is possible to detect a magnetic signal of each magnetic encoder track respectively. The plural rows of magnetic encoder tracks may be arranged in the direction perpendicular to the axial direction of the rotation axis of the magnetic encoder.

Each of the magnetic encoder tracks may be composed of either a ferrite sintered magnet or a magnet containing a ferrite powder mixed in a rubber or resin, and the thickness of the magnetic encoder track may be larger than 0.5 mm and less than 4 mm. A rare earth magnet may be used, but ferrite is more preferable in terms of cost. If the thickness of each magnetic encoder track, that is, the thickness of a magnet portion thereof, is less than 0.5 mm, a diamagnetic field within each formed magnetic encoder track becomes great. Thus, irreversible demagnetization is likely to occur during use at high temperature, and the reliability as a magnet is decreased. If the thickness of each magnetic encoder track is not smaller than 4 mm, the distance between magnetizing heads is increased, and thus it becomes difficult to cause sufficient magnetic flux to flow through the magnetic encoder track which is desired to be magnetized. According to this configuration, since the thickness of each magnetic encoder track is larger than 0.5 mm, the diamagnetic field within each formed magnetic encoder track is decreased, irreversible demagnetization is less likely to occur during use at high temperature, and it is possible to improve the reliability as a magnet. Furthermore, since the thickness of each magnetic encoder track is less than 4 mm, it is possible to shorten the distance between the magnetizing heads. Thus, it is possible to cause sufficient magnetic flux to flow to the magnetic encoder track which is desired to be magnetized.

The length L of each magnetic pole along the rotation direction of the magnetic pattern may be not shorter than 0.3 mm and not longer than 5 mm, and may meet a relationship of W>L for each track width W. Since W>L is met, it is possible to reduce an error caused by magnetic interference acting between the plural rows of magnetic encoder tracks. In addition, when the track width W is not smaller than 1 mm and not larger than 5 mm and the length L of each magnetic pole is not shorter than 0.3 mm and not longer than 5 mm, it is possible to detect a magnetic signal of each magnetic encoder track to a necessary and sufficient degree.

The magnetic encoder may be used such that the magnetic encoder is spaced apart across an air gap of larger than 0.3 mm and less than 4 mm from sensors which read magnetic signals of the respective magnetic encoder tracks. The reasons why the air gap is so set are as follows. If the air gap is not larger than 0.3 mm, there is the possibility that the sensors contact the magnetic encoder tracks formed from rubber or resin. In this case, the surfaces of the magnetic encoder tracks may be damaged. In addition, foreign matter is easily jammed between the magnetic encoder tracks and the sensors, and the surfaces of the magnetic encoder tracks may be damaged. If the air gap is not smaller than 4 mm, influence of a decrease in magnetization intensity or an error caused due to magnetic interference acting between the respective magnetic encoder tracks cannot be avoided.

In the magnetic encoder, the plural rows of magnetic encoder tracks may be arranged in the direction parallel to the axial direction of the rotation axis of the magnetic encoder. Each row of un-magnetized magnetic encoder track in the annular magnetic body may be positioned between the pair of opposed end portions and a spindle device may be provided which indexedly rotates the annular magnetic body about the rotation axis. There may be provided switching unit which relatively switches the positions of the magnetic encoder tracks with respect to the pair of opposed end portions over a magnetization position at which one row of magnetic encoder track is located between the pair of opposed end portions and another magnetization position at which another row of magnetic encoder tracks is located between the pair of opposed end portions.

In this case, in a state where desired one row of magnetic encoder track is located at the magnetization position, the magnetic encoder track is magnetized in the circumferential direction thereof while being indexedly rotated by the spindle device, and then the other row of magnetic encoder track is located between the pair of opposed end portions by the switching unit. Thereafter, the other row of magnetic encoder track can be magnetized in the circumferential direction thereof while being indexedly rotated.

In the magnetic encoder, the plural rows of magnetic encoder tracks may be arranged in the direction perpendicular to the axial direction of the rotation axis of the magnetic encoder. Each row of un-magnetized magnetic encoder track in the annular magnetic body may be positioned between the pair of opposed end portions and a spindle device may be provided which indexedly rotates the annular magnetic body about the rotation axis. There may be provided switching unit which relatively switches the positions of the magnetic encoder tracks with respect to the pair of opposed end portions over a magnetization position at which one row of magnetic encoder track is located between the pair of opposed end portions and another magnetization position at which another row of magnetic encoder tracks is located between the pair of opposed end portions.

The pair of opposed end portions of the magnetizing yoke may be arranged so as to confront to each other, and the magnetizing yoke may cause the magnetic flux to pass through the magnetic encoder track, thereby magnetizing the magnetic encoder track. In the case where the magnetic encoder tracks are magnetized by using such a so-called penetration type magnetizing yoke, the magnetic shield is able to effectively shield a leakage of the magnetic flux to the rows of magnetic encoder tracks other than the magnetization target.

The magnetic shield may include: a magnetic shield portion arranged adjacent to either one of the opposed end portions of the magnetizing yoke in an arrangement direction of the plural rows of magnetic encoder tracks of the magnetic encoder; and a magnetic path formation portion configured to cause the magnetic flux flowing through the magnetic shield portion and the one of the opposed end portions adjacent to the magnetic shield portion to flow to a portion of the magnetizing yoke which portion has magnetic pole polarity which is the same as that of the other of the opposed end portions, or to flow to a core member if the magnetic encoder includes the core member.

In this case, of the magnetic flux flowing between the pair of opposed end portions, the magnetic flux that is about to leak to the side of the magnetic encoder track adjacent to the magnetic encoder track that is the magnetization target flows from the magnetic shield portion of the magnetic shield via the magnetic path formation portion to the other of the opposed end portions of the magnetizing yoke or the core member of the magnetic encoder. Thus, the magnetic flux flowing between the opposed end portions is prevented from flowing to the adjacent magnetic encoder track side. Therefore, the adjacent magnetic encoder track is avoided from being undesirably magnetized. The magnetic shield portion of the magnetic shield is arranged adjacently in the arrangement direction of the magnetic encoder tracks. Thus, unlike the magnetic shield that covers the magnetic encoder tracks, the magnetic shield portion does not disturb an operation of disposing the annular magnetic body, for example, between the pair of opposed end portions of the magnetizing yoke. Therefore, it is possible to more easily dispose the magnetizing yoke and the like with respect to the annular magnetic body than in the conventional art, and it is possible to reduce man-hours for operation.

The magnetic shield portion may be provided at each of both sides, in the arrangement direction of the plural rows of magnetic encoder tracks, of the one of the opposed end portions of the magnetizing yoke. In this case, in magnetizing the row of magnetic encoder track that is the magnetization target, flow of the magnetic flux to the rows of magnetic encoder tracks other than the magnetization target is shielded by using the magnetic shield portion at one side. Thereafter, in magnetizing the shielded magnetic encoder track, flow of the magnetic flux to the previously magnetized row of magnetic encoder track is shielded by using the magnetic shield portion at the other side. In this manner, it is possible to simplify the magnetization step.

The magnetic shield may be attached to the portion of the magnetizing yoke which portion has the magnetic pole polarity identical with that of the other of the opposed end portions. In this case, by disposing the opposed end portions of the magnetizing yoke against the magnetic encoder, it is possible to cause leak of the magnetic flux to flow to the portion of the magnetic pole polarity, and an operation of disposing the magnetic shield can be made unnecessary. The arrangement direction of the plural rows of magnetic encoder tracks may be parallel to the rotation axis of the annular magnetic body.

A gap between the magnetic shield portion and the one of the opposed end portions of the magnetizing yoke may be not smaller than 0.5 mm and not larger than 3 mm. Since the lower limit of the gap is not smaller than 0.5 mm, it becomes possible to increase the magnetic flux flowing to the row of magnetic encoder track that is the magnetization target. Thus, it is possible to ensure a desired magnetization intensity. On the other hand, if the gap is less than 0.5 mm, the magnetic flux flowing from the opposed end portions of the magnetizing yoke to the magnetic shield portion is increased, and the magnetic flux flowing through the magnetic encoder track which requires magnetization is decreased. Thus, the magnetization intensity is decreased. If the gap exceeds 3 mm, the magnetic shield function is diminished.

A gap adjustment mechanism configured to adjust a gap between the magnetic shield portion and the one of the opposed end portions of the magnetizing yoke may be provided. By the gap adjustment mechanism, the gap is made most appropriate in accordance with the position of the magnetic encoder. Thus, it is possible to adjust the balance between the magnetic flux flowing through the magnetic encoder track and the magnetic flux flowing through the magnetic shield portion, and it is possible to ensure a desired magnetization intensity.

The magnetic shield may include a plurality of magnetic shield portions.

The magnetic shield portion may be formed such that a cross section of the magnetic shield portion taken along a plane including a rotation axis of the annular magnetic body has a rectangular plate shape, an L shape, or a circular arc shape. The shape of the magnetic shield portion can be selected to have any one of a rectangular plate shape, an L shape and a circular arc shape as a cross-sectional shape, in accordance with the shape of the magnetic encoder.

The magnetic shield portion may be attached to the magnetizing yoke via a non-magnetic body formed of a non-magnetic material. In this case, it becomes easy to manage the magnetic gap, and the magnetic shield portion can be easily attached. As the non-magnetic material, for example, aluminum, copper, a resin can be used.

A plurality of pairs of opposed end portions of the magnetizing yoke may be provided, and each pair of opposed end portions may be arranged offset in accordance with the arrangement positions of the plural rows of magnetic encoder tracks. In this case, it is possible to simultaneously magnetize the plural rows of magnetic encoder tracks. For example, in the case of a radial type magnetic encoder, each pair of opposed end portions are arranged offset in the axial direction thereof. In the case of an axial type magnetic encoder, each pair of opposed end portions are arranged offset in the radial direction thereof.

A magnetic sensor which detects a magnetization intensity of each magnetized magnetic pole may be provided. A magnetization intensity can be detected by the magnetic sensor, thereby confirming the quality of the magnetic encoder. The plural rows of un-magnetized magnetic encoder tracks may be simultaneously magnetized. In this case, it is possible to form a plurality of magnetic encoder tracks in a time taken for a single magnetization, and thus it is possible to make the magnetization time shorter than that when magnetization is performed per each row.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A first embodiment of the present invention will be described with reference to from FIGS. 1A to 6D. Each magnetization device according to the first embodiment and later embodiments is applied, for example, to a magnetization device for a magnetic encoder used for detecting rotation and rotation angles of various devices. The following description also includes a description regarding a magnetic encoder and a method for magnetizing the magnetic encoder.

Figure 1A:
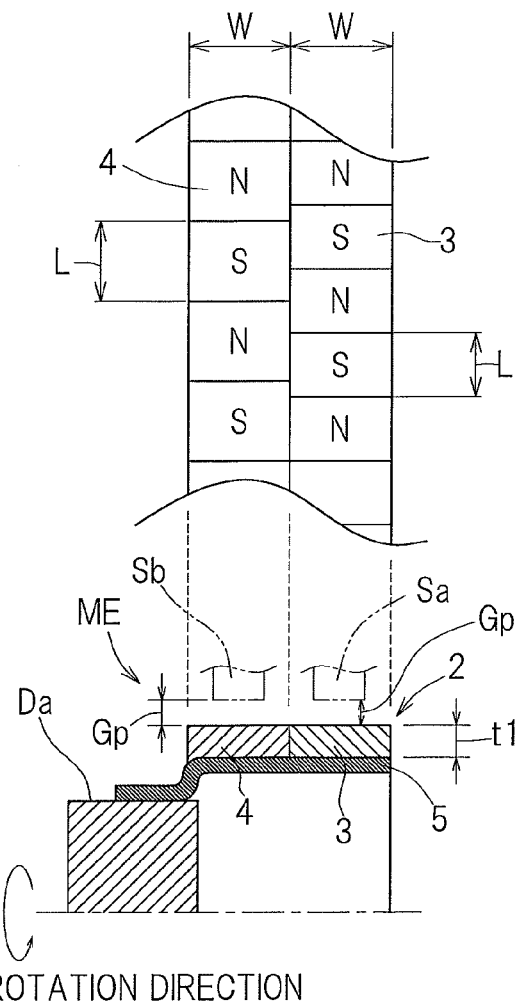
FIG. 1A is a combination diagram including a cross-sectional view of a radial type magnetic encoder according to a first embodiment of the present invention and a development view of a principal part of the radial type magnetic encoder.
Figure 1B:
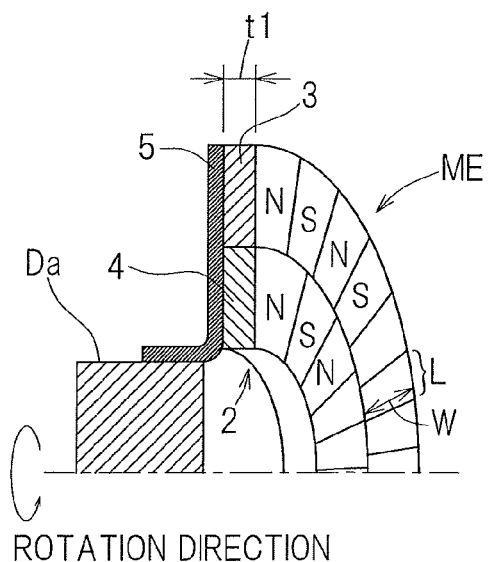
FIG. 1B is a perspective view of an axial type magnetic encoder.
Figure 3A:
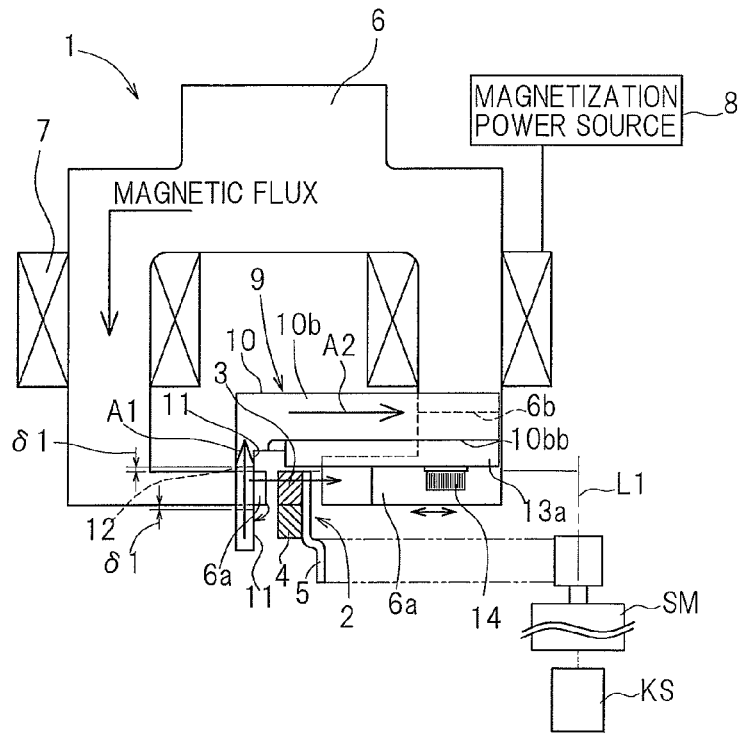
FIG. 3A is a side view showing a schematic configuration in which a magnetization device is applied to the radial type magnetic encoder.
Figure 3B:
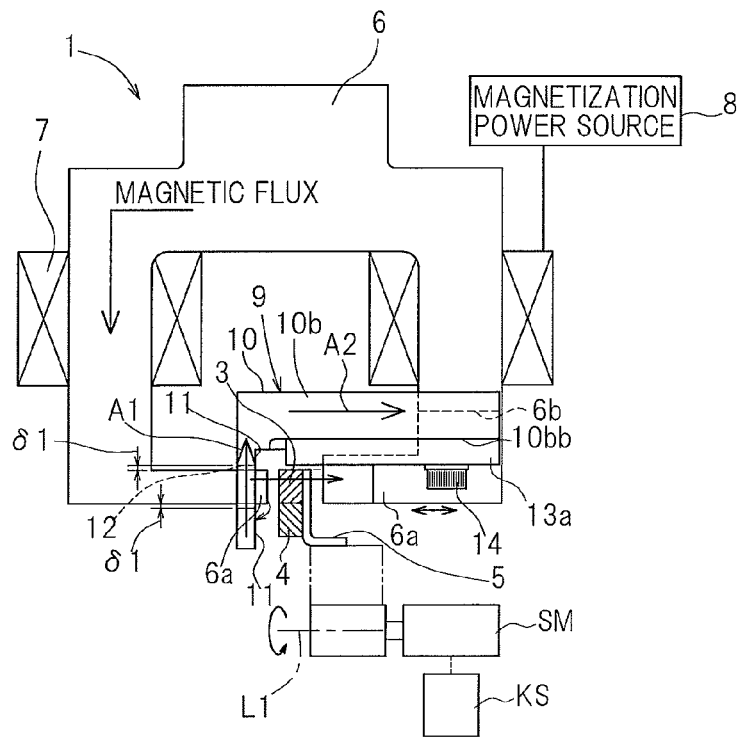
FIG. 3B is a side view showing an example in which the magnetization device is applied to the axial type magnetic encoder.

As shown in FIGS. 3A and 3B, in a magnetization device 1, while an annular magnetic body 2, which is a magnetization target, is rotated about a rotation axis L1 thereof, magnetic poles are magnetized one by one, whereby, for example, a magnetic encoder ME shown in FIG. 1A or 1B is obtained. The annular magnetic body 2 includes plural rows of annular un-magnetized magnetic encoder tracks 3, 4 which are arranged adjacent to each other and are integrated with the annular magnetic body 2. In the annular magnetic body 2, the plural rows of magnetic encoder tracks 3, 4 are provided on a surface of a disc-shaped (FIG. 1B) or cylindrical core member 5 such that the magnetic encoder tracks 3, 4 are arranged coaxially (FIG. 1A) and adjacent to each other. For example, as shown in FIG. 1B, the magnetic encoder ME obtained by magnetizing the axial type annular magnetic body 2 is mounted by press-fitting a cylindrical portion of the core member 5 onto an outer peripheral surface Da of a rotational ring of a bearing or the like. Each of the magnetic encoder tracks 3, 4 is, for example, a rubber, plastic, or a sintered element containing a magnetic powder, which is made into a rubber magnet, a plastic magnet, or a sintered magnet, respectively by magnetization. It is noted that the annular magnetic body 2 is not limited to an axial type, and may be, for example, a radial type as shown in FIG. 1A.

The features of the magnetic encoder will be described. As shown in FIG. 1A, in the radial type magnetic encoder ME, each of the magnetic encoder tracks 3, 4 has a track width W of not smaller than 1 mm and not larger than 5 mm, and each magnetic pole has a length L of not shorter than 0.3 mm and not longer than 5 mm. Each track width W is a track width in a track arrangement direction perpendicular to a rotation direction of the magnetic encoder ME. In FIG. 1A, the "track arrangement direction perpendicular to the rotation direction" refers to a direction parallel to the axial direction of a rotation axis of the magnetic encoder ME. The length L of each magnetic pole is the length of each magnetic pole in a magnetic pattern along the rotation direction of the magnetic encoder ME. It is noted that three or more rows of tracks may be provided in the magnetic encoder, a non-magnetized area may be provided between the tracks, and the widths W of the respective tracks do not necessarily need to be equal to each other.

Figure 2A:
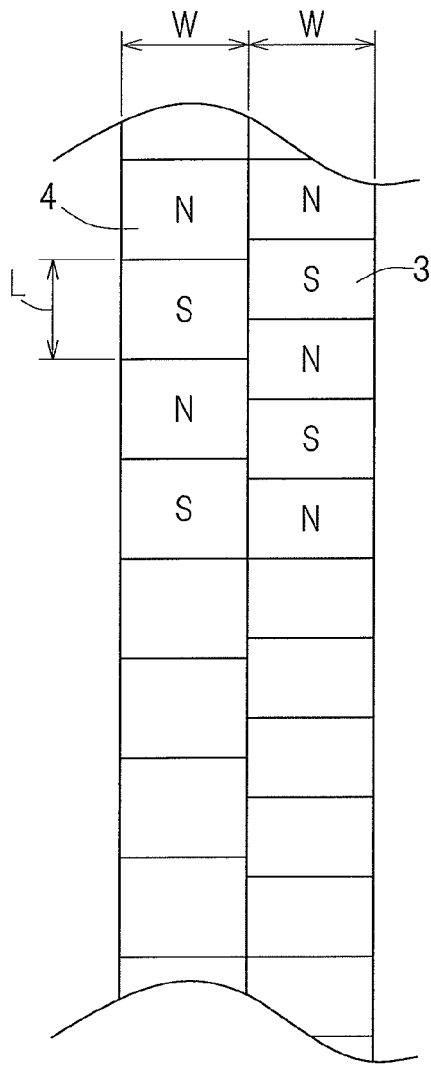
FIG. 2A is a development view illustrating a relationship between each track width and each magnetic pole length of the magnetic encoder.
Figure 2B:
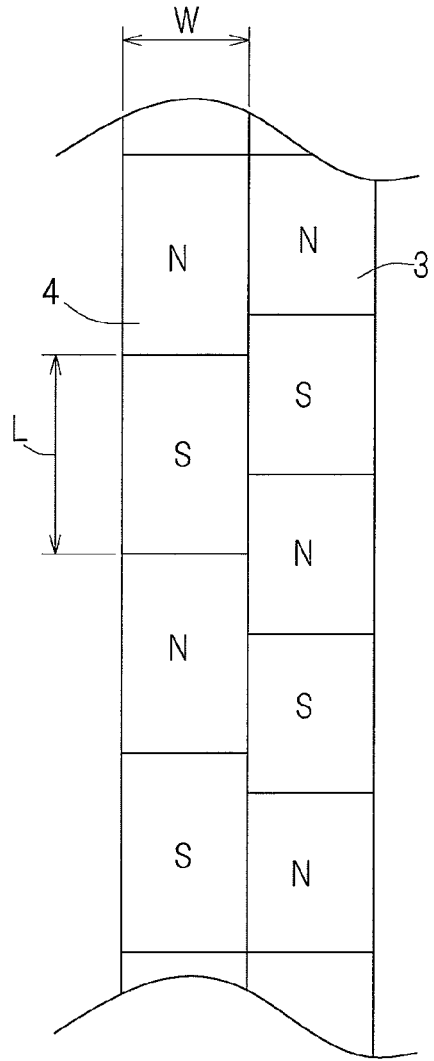
FIG. 2B is a development view for reference, illustrating a relationship between each track width and each magnetic pole length.

Each track width W and the length L of each magnetic pole may meet a relationship of W>L as shown in FIG. 2A. In addition, although described later, magnetic patterns different form each other are formed on the magnetic encoder tracks 3, 4, respectively. It is noted that regarding the axial type magnetic encoder ME as well, similarly to the radial type, each track width W may be not smaller than 1 mm and not larger than 5 mm, the length L of each magnetic pole may be not shorter than 0.3 mm and not longer than 5 mm, and further a relationship of W>L may be met. In FIG. 1B, the "track arrangement direction perpendicular to the rotation direction" refers to a direction perpendicular to the axial direction of the rotation axis of the magnetic encoder ME.

As shown in FIGS. 1A and 1B, each of the magnetic encoder tracks 3, 4 is composed of a magnet molded through sintering of ferrite (a so-called ferrite sintered magnet) or a molded magnet containing a ferrite magnetic powder mixed in a rubber or resin. A rare earth magnet may be used, but ferrite is more preferable in terms of cost. Each of the magnetic encoder tracks 3, 4 has a thickness t1 of larger than 0.5 mm and less than 4 mm. Furthermore, the magnetic encoder ME is used such that a detection surface thereof is spaced apart across an air gap Gp of larger than 0.3 mm and less than 4 mm from sensors Sa, Sb (FIG. 1A) which read magnetic signals of the respective magnetic encoder tracks 3, 4.

Figure 5:
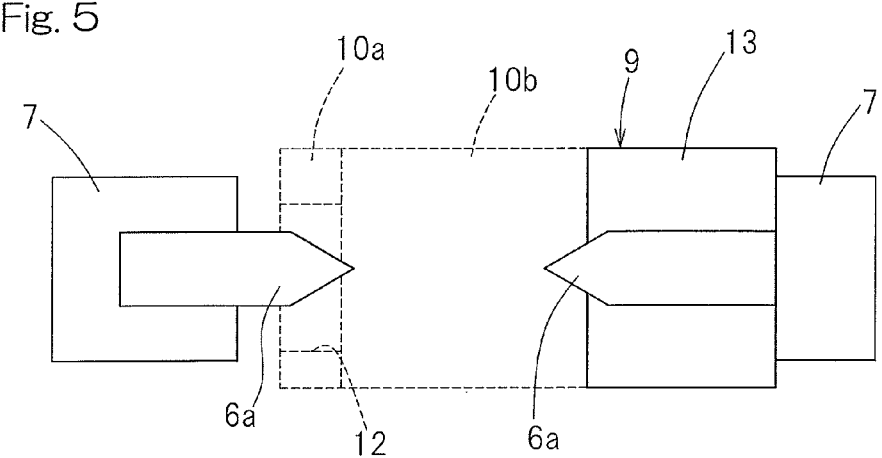
FIG. 5 is a bottom view of a principal part of the magnetization device.

As shown in FIGS. 3A and 3B, the magnetization device 1 includes a magnetizing yoke 6, an exciting coil 7 supplied with power from an external magnetization power source 8, and a magnetic shield 9 including a plurality of magnetic shield portions 11. Furthermore, the magnetization device 1 includes a spindle device SM which indexedly rotates the annular magnetic body 2 about the rotation axis of the magnetic encoder ME, and switching unit KS which relatively switches magnetization positions of the magnetic encoder tracks 3, 4 with respect to a pair of opposed end portions 6a, 6a. A main body of the spindle device SM is connected to the switching unit KS. As the switching unit KS, for example, a fluid pressure cylinder or the like is used. As shown in FIG. 5, the magnetizing yoke 6 includes the pair of opposed end portions 6a, 6a which are opposed to each other across a magnetic gap. Each opposed end portion 6a is formed in a tapered shape which is narrower toward its end in a plan view.

As shown in FIGS. 3A and 3B, the exciting coil 7 is wound on the magnetizing yoke 6. The magnetization power source 8 supplies a magnetizing current to the exciting coil 7 to generate or pass magnetic flux between the opposed end portions 6a, 6a. Desired one row of magnetic encoder track 3 (4) in the annular magnetic body 2 is disposed in the magnetic gap. That is, desired one row of magnetic encoder track (the magnetic encoder track 3 in the example of FIGS. 3A and 3B) is disposed so as to be interposed between the opposed end portions 6a, 6a via gaps, whereby the magnetic flux is passed through the un-magnetized magnetic encoder track to magnetize the magnetic encoder track. In this case, for example, the annular magnetic body 2 is held by the spindle device SM, and the spindle device SM is indexedly rotated, whereby N magnetic poles and S magnetic poles are alternately magnetized in the circumferential direction of the magnetic encoder track 3. Next, the other row of magnetic encoder track 4 is positioned between the pair of opposed end portions 6*a*, 6*a* by using the switching unit KS. Thereafter, similarly to the above, the other row of magnetic encoder track 4 can be indexedly rotated by the spindle device SM to be magnetized in the circumferential direction thereof.

The magnetic shield 9 is provided to the magnetizing yoke 6 and shields flow of the magnetic flux to the row of magnetic encoder track 3 (4) other than the magnetization target. The magnetic shield 9 is formed from a ferromagnetic material, and includes a magnetic path formation portion 10 shown in FIG. 4 and the magnetic shield portions 11, 11 arranged in the up-down direction in FIG. 4. The magnetic shield 9 is attached to one of magnetizing heads which are end portions of the magnetizing yoke 6 in FIGS. 3A and 3B, that is, to the opposed end portion 6*a* at the right side in the example of FIG. 5 which is a bottom view. The magnetic shield portions 11, 11 of the magnetic shield 9 are arranged adjacent to the opposed end portion 6*a* at the left side in FIG. 5 and at both sides thereof in the arrangement direction of the plural rows of magnetic encoder tracks 3, 4. In the radial type annular magnetic body 2 in FIG. 3A, the arrangement direction of the magnetic encoder tracks 3, 4 is parallel to the rotation axis L1 of the annular magnetic body 2.

Figure 4:
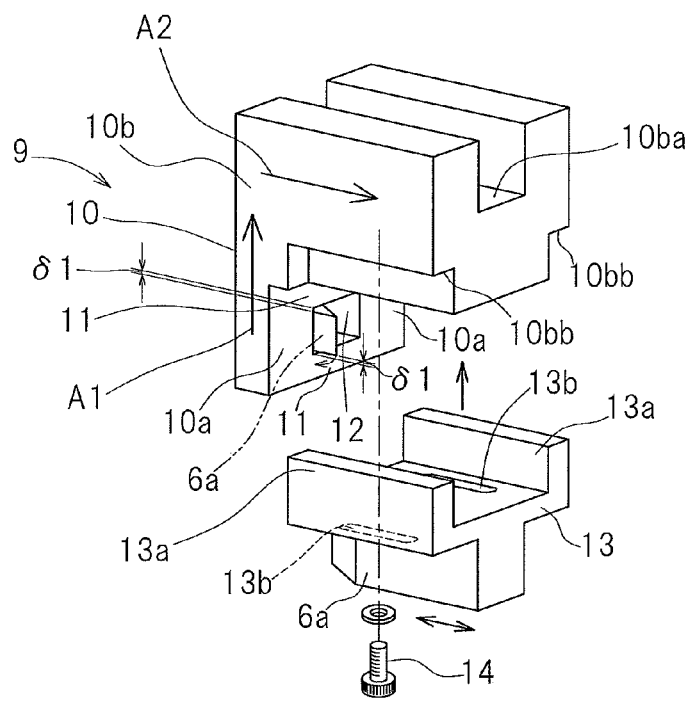
FIG. 4 is an exploded perspective view of a magnetic shield of the magnetization device.

As shown in FIG. 4, the magnetic path formation portion 10 has a function to cause the magnetic flux flowing through the magnetic shield portions 11, 11 and the left-side opposed end portion 6*a* adjacent to the magnetic shield portions 11, 11 to flow to a portion of the magnetizing yoke 6 which portion has magnetic pole polarity identical with that of the right-side opposed end portion 6*a*. In the case where the magnetic encoder ME (magnetic encoder tracks 3, 4) in FIGS. 3A and 3B includes a core member, the magnetic path formation portion 10 has a function to cause the above magnetic flux to flow to the core member. The magnetic path formation portion 10 in FIG. 4 includes first magnetic path formation portions 10*a*, 10*a* connecting the two magnetic shield portions 11, 11, and a second magnetic path formation portion 10*b* provided so as to extend over upper ends of the first magnetic path formation portions 10*a*, 10*a* and a base end portion 6*b* at the right-side opposed end portion 6*a* side in FIGS. 3A and 3B. As shown in FIG. 4, the second magnetic path formation portion 10*b* is provided with a recess-shaped portion 10*ba* which is attachable to and detachable from the base end portion 6*b* at the opposed end portion 6*a* side which base end portion 6*b* is composed of a projection-shaped portion. However, the second magnetic path formation portion 10*b* may be provided so as to be integrated with the base end portion 6*b* at the right-side opposed end portion 6*a* side. As shown by arrows A1, A2 in FIGS. 3A and 3B, and FIG. 4, the magnetic flux is caused to flow sequentially via the first magnetic path formation portions 10*a*, 10*a* and the second magnetic path formation portion 10*b* to the base end portion 6*b* at the opposed end portion 6*a* side.

The left-side opposed end portion 6*a* is inserted through a through hole 12 for forming the first magnetic path formation portions 10*a*, 10*a* of the magnetic path formation portion 10. In a state where the left-side opposed end portion 6*a* is inserted through the through hole 12, a gap δ1 between each magnetic shield portion 11 and the left-side opposed end portion 6*a* is set to a predetermined gap of not smaller than 0.5 mm and not larger than 3 mm and is unchanged.

In addition, the right-side opposed end portion 6*a* is configured to be able to be close to and separated from the left-side opposed end portion 6*a*. For example, guided portions 10*bb*, 10*bb* are formed at both sides of a lower surface of the second magnetic path formation portion 10*b* and extend in a right-left direction in which the opposed end portions 6*a*, 6*a* of the magnetizing yoke 6 are opposed to each other. A guide member 13 having a cross section with a recess shape is integrally provided on an upper surface of the right-side opposed end portion 6*a*. The guide member 13 includes guide portions 13*a*, 13*a* which slidably guide the guided portions 10*bb*, 10*bb*. Long holes 13*b*, 13*b* for inserting bolts 14 therethrough are formed in both side edge portions of the guide member 13 which are close to the respective guide portions 13*a*.

Therefore, by moving and adjusting the right-side opposed end portion 6*a* along the guided portions 10*bb*, 10*bb*, the annular magnetic body 2 to be magnetized can be disposed between the opposed end portions 6*a*, 6*a*, and the magnetic gap can be adjusted. After the magnetic gap adjustment, the right-side opposed end portion 6*a*, which is integrally formed with the guide member 13, can be fixed to the magnetic path formation portion 10 by a method in which a pair of the bolts 14 inserted through the long holes 13*b* are screwed into screw holes provided in the second magnetic path formation portion 10*b*.

FIGS. 6A to 6D show respective pattern examples of magnetic poles magnetized in each magnetic encoder track of the annular magnetic body by using the above-described indexed magnetization and the like. In a pattern example 1 in FIG. 6A, one row of magnetic encoder track 3 is made into a track for rotation detection by alternately magnetizing to form magnetic poles different from each other at equal pitches therein. The other row of magnetic encoder track 4 is made into a track for Z phase signal generation which generates a Z phase signal indicating a rotation reference position, by magnetizing to form a magnetic pole for rotation reference position detection at one location (or a plurality of locations) on the circumference of the track. In a pattern example 2 in FIG. 6B, the one row of magnetic encoder track 3 is made into a track for rotation detection by alternately magnetizing to form magnetic poles different from each other at equal pitches therein. The other row of magnetic encoder track 4 is made into another track for rotation detection by alternately magnetizing to form magnetic poles different from each other at equal pitches therein such that the number of the magnetic poles is different from that in the track for rotation detection.

Figure 6A:
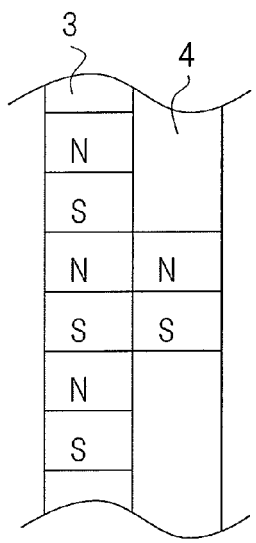
FIG. 6A is a development view showing a pattern example 1 of magnetic poles magnetized in each magnetic encoder track.
Figure 6B:
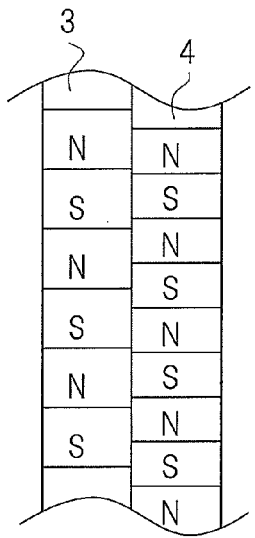
FIG. 6B is a development view showing a pattern example 2 of magnetic poles magnetized in each magnetic encoder track.
Figure 6C:
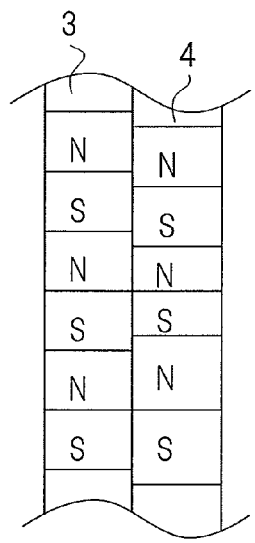
FIG. 6C is a development view showing a pattern example 3 of magnetic poles magnetized in each magnetic encoder track.

In a pattern example 3 in FIG. 6C, the one row of magnetic encoder track 3 is made into a track for rotation detection by alternately magnetizing to form magnetic poles different from each other at equal pitches therein. The other row of magnetic encoder track 4 is made into another track for rotation detection by alternately magnetizing to form magnetic poles different from each other such that the number of the magnetic poles is the same as that in the track for rotation detection and the phase of each magnetic pole is shifted from that in the track for rotation detection.

Figure 6D:
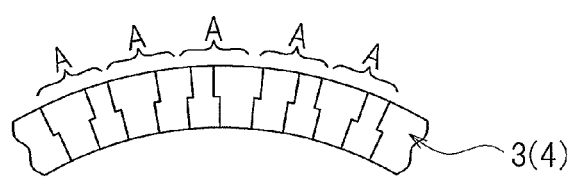
FIG. 6D is a development view showing a pattern example 4 of magnetic poles magnetized in each magnetic encoder track.

In a pattern example 4 in FIG. 6D, each magnetic pole pair A of the magnetic encoder track 3 (4) in the axial type annular magnetic body is magnetized such that each of the width of an N magnetic pole and the width of an S magnetic pole in each magnetic pole pair A is different from each other half portions along the outer circumference of the track, namely, between the inner side and the outer side in the radial direction, in order to form a pattern similar to that in the pattern example 3 in FIG. 6C.

As described above, the air gap Gp between the magnetic sensors which read the magnetic signals of the respective magnetic encoder tracks 3, 4 and the magnetic encoder track surface which is the detection surface is 0.3 mm to 4 mm. This is because: if the air gap Gp is less than 0.3 mm, there is the possibility that the magnetic sensors contact the magnetic encoder tracks 3, 4 formed from rubber or resin; and if the air gap Gp exceeds 4 mm, influence of a decrease in magnetization intensity or an error caused due to magnetic interference acting between the respective magnetic encoder tracks 3, 4 cannot be avoided.

Although a magnetic field intensity which is detected by each sensor is changed depending on setting of the air gap Gp, if, generally, each of the track widths W of the respective magnetic encoder tracks 3, 4 is set in the range of 1 to 5 mm and the magnetic pole length L is set in the range of 0.3 to 5 mm, the magnetic field intensity is sufficiently detectable. In addition, a relationship between W and L may be established as W>L. In the case of W<L as shown in a reference diagram of FIG. 2B, an error caused due to magnetic interference acting between the plural rows of magnetic encoder tracks 3, 4 is relatively great, and thus the accuracy tends to deteriorate particularly if W is small.

Meanwhile, the thickness t1 of each magnetic encoder track (the thickness of the magnetic portion thereof) is 0.5 mm to 4 mm. If each of the magnetic encoder tracks 3, 4 has a thickness of less than 0.5 mm, a diamagnetic field within each formed magnetic encoder track becomes great, thus irreversible demagnetization is likely to occur during use at high temperature, and the reliability as a magnet is decreased. If each of the magnetic encoder tracks 3, 4 has a thickness exceeding 4 mm, the distance between the magnetizing heads is increased, and thus it becomes difficult to cause sufficient magnetic flux to flow through the magnetic encoder tracks 3, 4 which are desired to be magnetized. Even with these complicated magnetic patterns, the row of magnetic encoder track that is a desired magnetization target is magnetized by passing the magnetic flux between the opposed end portions 6a, 6a and magnetizing to form magnetic poles one by one while rotating the annular magnetic body 2. At that time, each magnetic shield portion 11 shields flow of the magnetic flux to the row of magnetic encoder track other than the magnetization target.

Figure 7A:
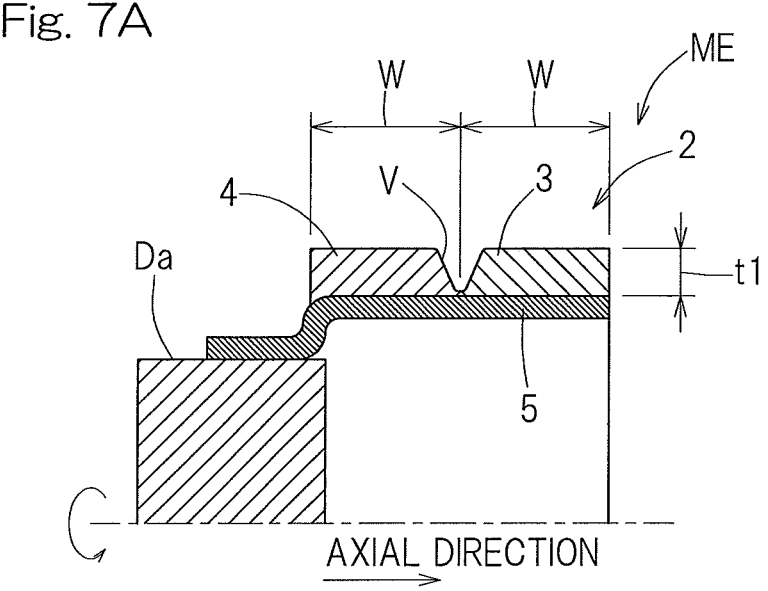
FIG. 7A is a cross-sectional view showing a partially changed form of the shape of the radial type magnetic encoder.
Figure 7B:
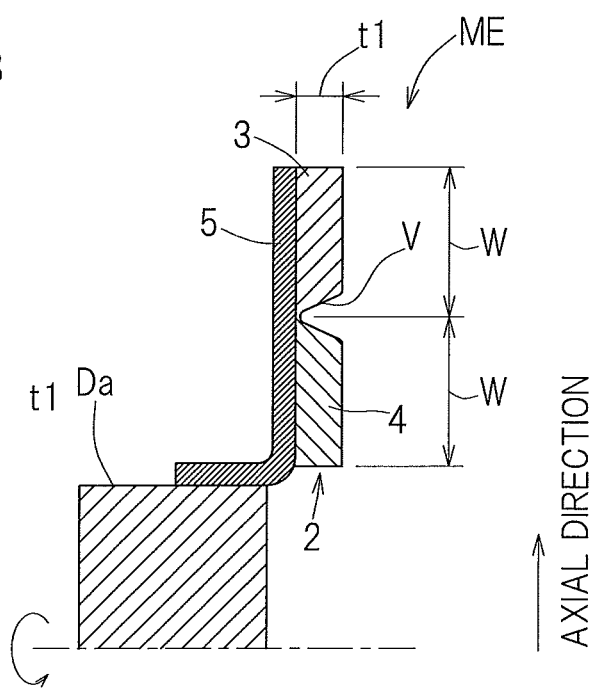
FIG. 7B is a cross-sectional view showing a partially changed form of the shape of the axial type magnetic encoder.

FIG. 7A is a cross-sectional view showing a partially changed form of the shape of the radial type magnetic encoder, and FIG. 7B is a cross-sectional view showing a partially changed form of the shape of the axial type magnetic encoder. A structure may be provided in which a groove V is provided between the plurality of magnetic encoder tracks 3, 4. The groove V is formed in a V cross-sectional shape which is narrower toward the bottom of the groove. The groove V reduces mutual influence in the magnetization step and magnetic interference in detection by the sensors, and thus it is possible to realize a plural-row magnetic encoder having higher accuracy. In addition, since the groove V is formed in a V cross-sectional shape which is narrower toward the bottom of the groove, it is possible to assuredly separate the surfaces of the adjacent magnetic encoder tracks 3, 4 from each other. Therefore, it is possible to realize a plural-row magnetic encoder having higher accuracy than that in FIGS. 1A and 1B.

Figure 8A:
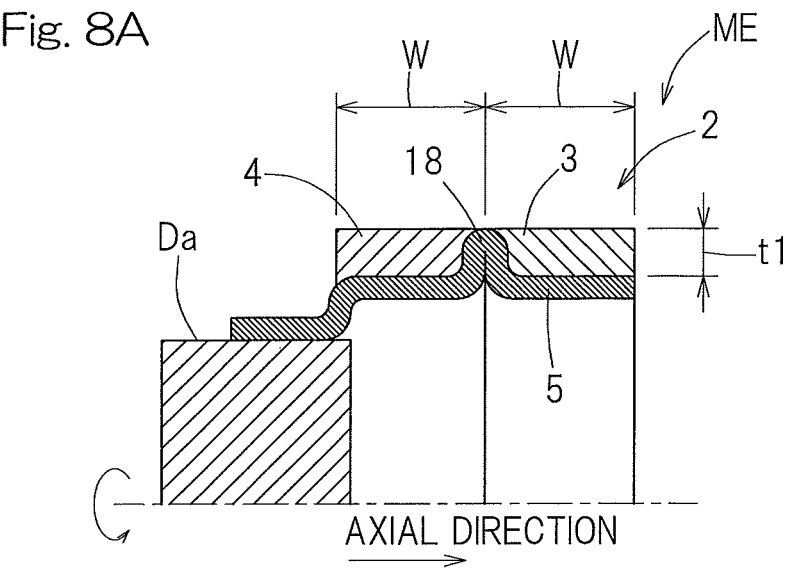
FIG. 8A is a cross-sectional view showing a partially changed form of the shape of the radial type magnetic encoder.
Figure 8B:
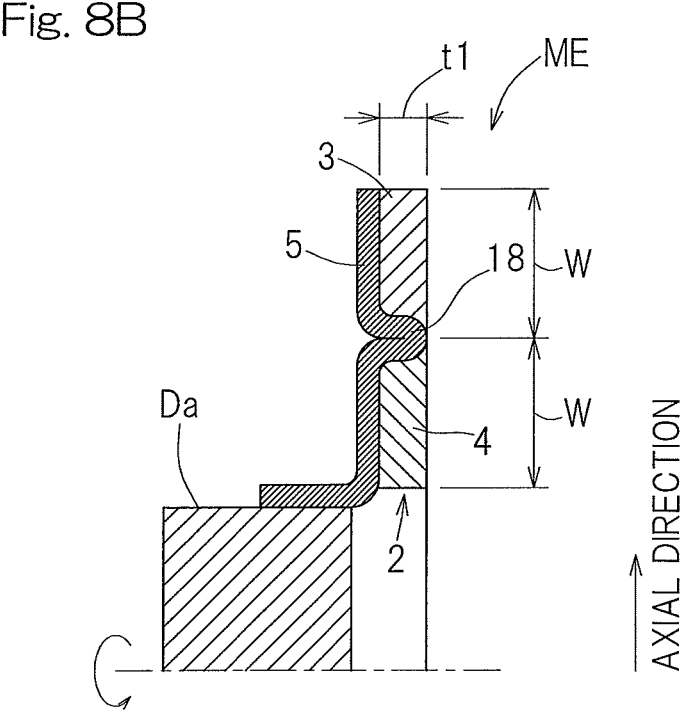
FIG. 8B is a cross-sectional view showing a partially changed form of the shape of the axial type magnetic encoder.

In addition, as shown in FIGS. 8A and 8B, a structure may be provided in which a spacer 18 which is a magnetic material is arranged between the plurality of magnetic encoder tracks 3, 4. The spacer 18, which is composed of the magnetic material, absorbs respective leakage magnetic fields from the magnetic encoder tracks 3, 4, thus mutual magnetic interference is reduced, and it is possible to realize a plural-row magnetic encoder having higher accuracy. Even in a state where the shape of the magnetic encoder has been changed, it is possible to magnetize a desired magnetic encoder track by the magnetization device using the magnetic shield portions 11.

According to the magnetization device 1 described above, in a state where one of the magnetizing heads shown in FIGS. 3A and 3B is not fixed to the magnetic path formation portion 10, the opposed end portions 6a, 6a of the magnetizing yoke 6 are disposed with respect to the plural rows of the un-magnetized magnetic encoder tracks 3 (4). At that time, since the magnetic shield 9 is provided to the magnetizing yoke 6, the magnetic shield 9 is simultaneously disposed at a predetermined position with respect to the magnetic encoder track 3 (4). Next, after the right-side opposed end portion 6a is moved and adjusted with respect to the left-side opposed end portion 6a, the right-side opposed end portion 6a is fixed to the second magnetic path formation portion 10b.

Thereafter, by supplying the magnetizing current from the magnetization power source 8 to the exciting coil 7, the magnetic flux is passed between the opposed end portions 6a, 6a. By passing the magnetic flux between the opposed end portions 6a, 6a while rotating the annular magnetic body 2, desired one row of magnetic encoder track 3 (4) is magnetized. At that time, the magnetic shield portions 11 shield leak of the magnetic flux to the adjacent row of magnetic encoder track 4 (3).

That is, the magnetic flux that is about to leak to the side of the magnetic encoder track 4 adjacent to the magnetic encoder track 3 that is the magnetization target flows from the magnetic shield portions 11 via the first magnetic path formation portions 10a, 10a and the second magnetic path formation portion 10b to the right-side opposed end portion 6a side of the magnetizing yoke 6. Therefore, the adjacent magnetic encoder track 4 is avoided from being undesirably magnetized. The magnetic shield portions 11, 11 of the magnetic shield 9 are arranged adjacent to one of the opposed end portions 6a of the magnetizing yoke 6 in the arrangement direction of the plural rows of magnetic encoder tracks 3, 4. Thus, unlike the magnetic shield 9 that covers the magnetic encoder tracks, the magnetic shield portions 11, 11 do not disturb an operation of disposing the annular magnetic body 2 between the pair of opposed end portions 6a, 6a of the magnetizing yoke 6. Therefore, it is possible to more easily dispose the magnetizing yoke 6 or the like with respect to the annular magnetic body 2 than in the conventional art, and it is possible to reduce man-hours for operation.

The magnetic shield portions 11 allow the magnetic encoder track 3 (4) that is the magnetization target to be accurately magnetized without influencing the adjacent magnetic encoder track 4 (3). In this case, each time the magnetization step is performed, magnetization of the magnetic encoder track 3 (4) can be performed without requiring an operation of attaching and detaching the magnetic shield 9, or the like, and thus it is possible to reduce the steps for magnetization. The magnetic shield portions 11, 11 are respectively provided at both sides, in the arrangement direction of the plural rows of magnetic encoder tracks 3, 4, of the left-side opposed end portion 6a of the magnetizing yoke 6. Thus, in magnetizing the row of magnetic encoder track 3 that is a magnetization target, flow of the magnetic flux to the row of magnetic encoder track 4 other than the magnetization target is shielded by using the magnetic shield portion 11 at the lower side in the arrangement direction. Thereafter, in magnetizing the shielded magnetic encoder track 4, flow of the magnetic flux to the previously magnetized row of magnetic encoder track 3 is shielded by using the magnetic shield portion 11 at the upper side in the arrangement direction. In this manner, it is possible to simplify the magnetization step.

Since the lower limit of the gap δ1 between each of the magnetic shield portions 11, 11 and the one of the opposed end portions 6a of the magnetizing yoke 6 is 0.5 mm, it is possible to increase the magnetic flux flowing to the row of magnetic encoder track 3 (4) that is the magnetization target. Thus, it is possible to ensure a desired magnetization intensity. On the other hand, if the gap δ1 is less than 0.5 mm, the magnetic flux flows from the opposed end portions 6a, 6a of the magnetizing yoke 6 to the magnetic shield portions 11, the magnetic flux that flows through the magnetic encoder track 3 (4) which requires magnetization is decreased, and thus the magnetization intensity is decreased. If the gap exceeds 3 mm, the magnetic shield function is diminished.

Other embodiments of the present invention will be described. In the following description, portions in each embodiment corresponding to matters described in the preceding embodiment are designated by the same reference numerals, and the overlap description thereof is omitted. When only a part of a configuration is described, the remaining part of the configuration is the same as that of the previously described embodiment. In addition to the combination of portions described specifically in each embodiment, the embodiments can be partially combined, unless any problem is particularly posed due to the combination.

Figure 9:
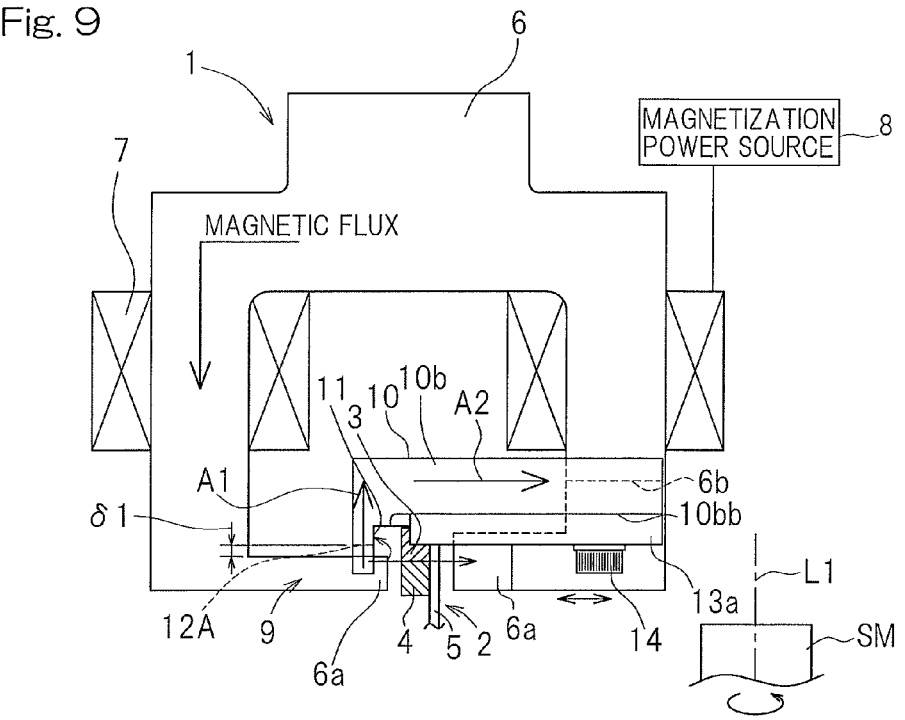
FIG. 9 is a diagram showing a schematic configuration of a magnetization device for a magnetic encoder according to a second embodiment of the present invention.
Figure 10:
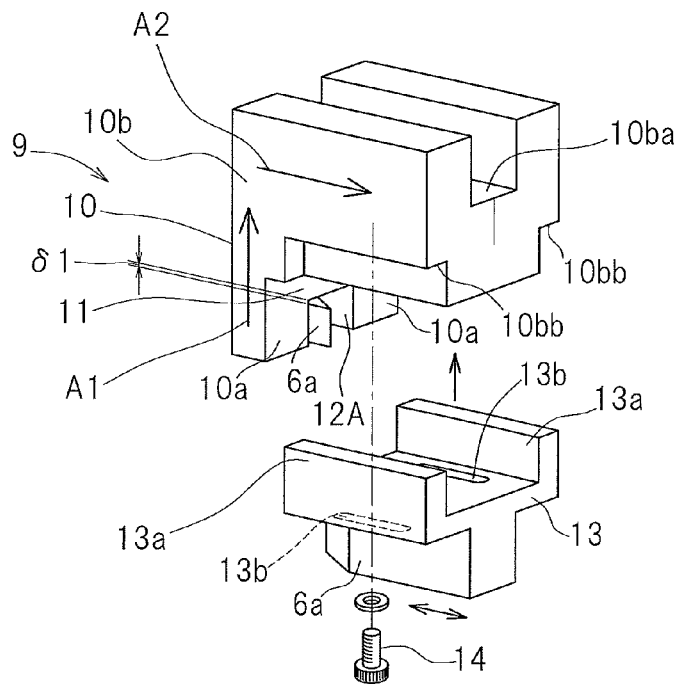
FIG. 10 is an exploded perspective view of a magnetic shield of the magnetization device.

In a second embodiment shown in FIGS. 9 and 10, the magnetic shield portion 11 is arranged at only one side, in the arrangement direction of the plural rows of magnetic encoder tracks 3, 4, of the left-side opposed end portion 6a. In this configuration, the left-side opposed end portion 6a is inserted through a groove 12A for forming the first magnetic path formation portions 10a, 10a of the magnetic path formation portion 10. The gap δ1 between the magnetic shield portion 11 and the left-side opposed end portion 6a is set to a predetermined gap of not smaller than 0.5 mm and not larger than 3 mm and is unchanged. The other configuration is the same as in the first embodiment shown in from FIGS. 1A to 6D. In this example, by disposing one row of magnetic encoder track 4 that is a magnetization target between the opposed end portions 6a, 6a and disposing the magnetic encoder track 3, which is not to be magnetized, at the upper side of the magnetic encoder track 4 in the arrangement direction, it is possible to shield flow of the magnetic flux to the magnetic encoder track 3. Since the magnetic shield portion 11 is provided at only one side in the arrangement direction, it is possible to simplify the structure of the magnetic shield 9 and reduce the manufacturing cost of the magnetization device 1.

Figure 11:
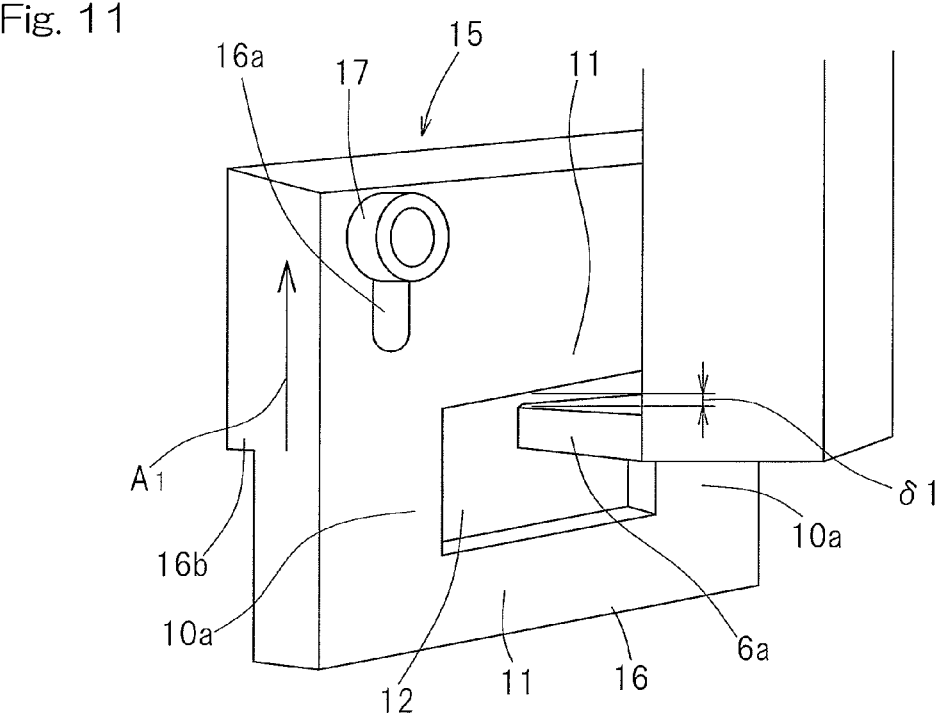
FIG. 11 is a perspective view schematically showing the appearance of a magnetization device for a magnetic encoder according to a third embodiment of the present invention.
Figure 12A:
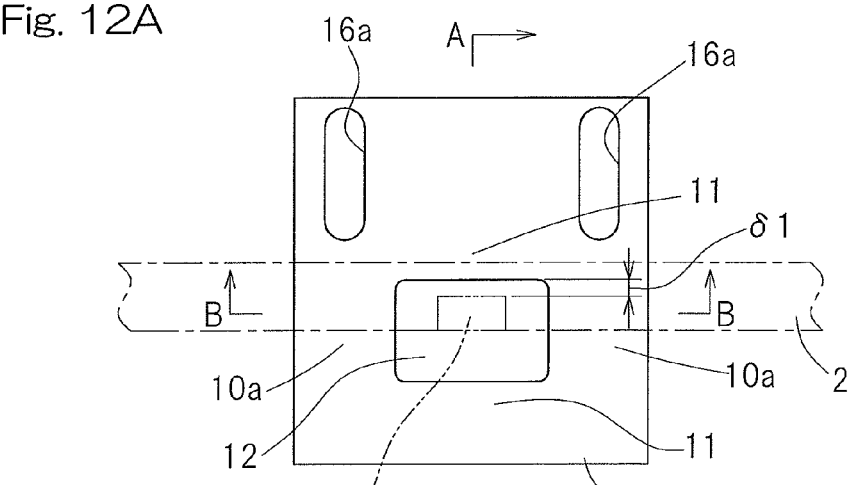
FIG. 12A is a front view of a magnetic shield of the magnetization device.
Figure 12B:
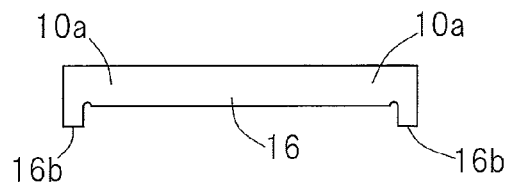
FIG. 12B is a bottom view of the magnetic shield.

In a third embodiment shown in FIG. 11 and FIGS. 12A and 12B, a gap adjustment mechanism 15 is provided which adjusts the gap between each magnetic shield portion 11 of the magnetic shield 9 and the magnetizing head. FIG. 11 is a perspective view schematically showing a magnetization device according the third embodiment, FIG. 12A is a front view of a magnetic shield of the magnetization device, and FIG. 12B is a bottom view of the magnetic shield.

The gap adjustment mechanism 15 will be described with reference to FIG. 11 and FIGS. 12A and 12B. The gap adjustment mechanism 15 includes a plate 16 which has a pair of long holes 16a, 16a formed therein, and bolts 17 which are inserted through the respective long holes 16a. The pair of long holes 16a, 16a are formed in the substantially rectangular frame-shaped plate 16 forming the magnetic shield portions 11, 11 and the first magnetic path formation portions 10a, 10a, and a screw portion of each bolt 17 is insertable through each long hole 16a. Each long hole 16a is opened so as to extend in the arrangement direction. Screw holes into which the respective bolts 17 are screwed are formed in a right end portion of the second magnetic path formation portion 10b (see FIG. 4). Guide portions 16b, 16b are provided along the arrangement direction and at both sides of a back surface of the plate 16.

Guided portions are provided along the arrangement direction and in the right end portion of the second magnetic path formation portion 10b (see FIG. 4), and the guide portions 16b, 16b of the plate 16 are guided along these guided portions. For example, in a state where each bolt 17 is provisionally screwed into the screw hole, by moving the guide portions 16b, 16b of the plate 16 along the guided portions, the gap δ1 is adjusted. After the gap δ1 is adjusted to a determined gap of not smaller than 0.5 mm and not larger than 3 mm, each bolt 17 is fastened.

According to this configuration, the gap adjustment mechanism 15 allows the gap δ1 to be made most appropriate in accordance with the position (or the shape) of the magnetic encoder. Thus, it is possible to adjust the balance between the magnetic flux flowing through the magnetic encoder track 3 (4) and the magnetic flux flowing through the magnetic shield portions 11, and it is possible to ensure a desired magnetization intensity. It is noted that it is not always necessary to fasten the gap adjustment mechanism 15 by means of the bolts, and the gap adjustment mechanism 15 may be a mechanism which performs automatic adjustment by means of an actuator or the like.

Figure 13:
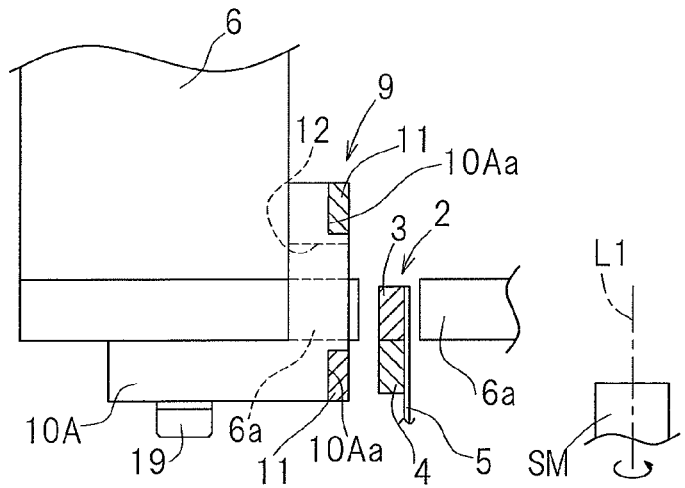
FIG. 13 is a side view showing a principal part of a magnetization device for a magnetic encoder according to a fourth embodiment of the present invention.

In a fourth embodiment shown in FIG. 13, the magnetic shield 9 includes a non-magnetic body 10A formed from a non-magnetic material such as aluminum, copper, and magnetic shield portions 11, 11 which are fixedly attached to upper and lower step portions 10Aa, 10Aa of the non-magnetic body 10A, respectively. The non-magnetic body 10A is provided to the left-side opposed end portion 6a via a bolt 19 so as to be attachable thereto/detachable therefrom. These magnetic shield portions 11, 11 are arranged adjacent to the left-side opposed end portion 6a in the arrangement direction of the plural rows of magnetic encoder tracks 3, 4. Each magnetic shield portion 11 is formed such that a cross section of the magnetic shield portion 11 taken along a plane including the rotation axis L1 has a rectangular plate shape. According to this example, since the magnetic shield portions 11, 11 are provided to the opposed end portion 6a of the magnetizing yoke 6 via the non-magnetic body 10A, it becomes easy to manage the magnetic gap, and the magnetic shield portions 11 can be easily attached.

Figure 14A:
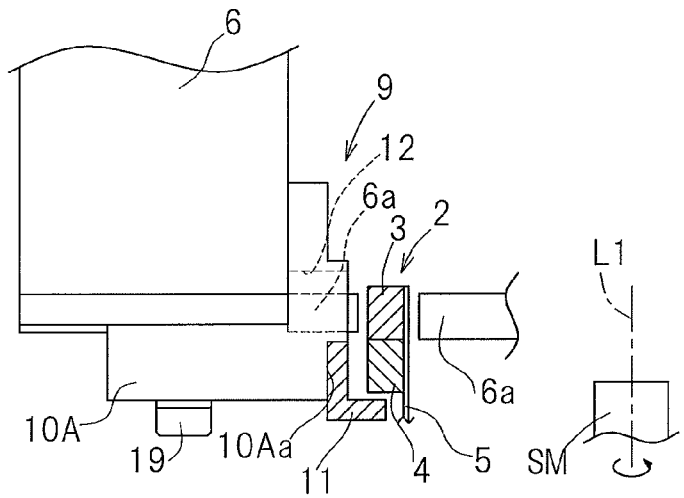
FIG. 14A is a side view showing a principal part of an example of a magnetization device for a magnetic encoder according to a fifth embodiment of the present invention.
Figure 14B:
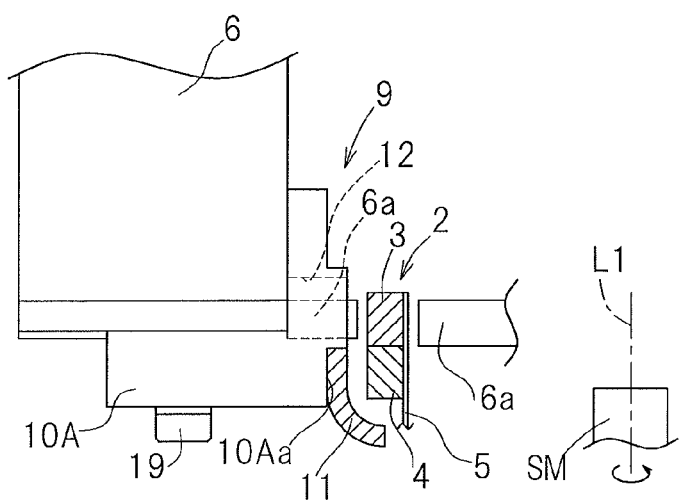
FIG. 14B is a side view showing a principal part of a modification of the magnetization device.

In a fifth embodiment shown in FIG. 14A, the magnetic shield portion 11 is attached to the step portion 10Aa of the non-magnetic body 10A in the magnetic shield 9. The magnetic shield portion 11 is formed in an L cross-sectional shape. In a modification shown in FIG. 14B, the magnetic shield portion 11 having an L cross-sectional shape is changed to a magnetic shield portion 11 having a circular arc cross-sectional shape. In these cases as well, since the magnetic shield portion 11 is provided to the opposed end portion 6a of the magnetizing yoke 6 via the non-magnetic body 10A, it becomes easy to manage the magnetic gap, and the magnetic shield portion 11 can be easily attached. In addition, the structure is more simplified than that of the magnetic shield 9 according to the fourth embodiment shown in FIG. 13, and the manufacturing cost can be reduced.

Figure 15:
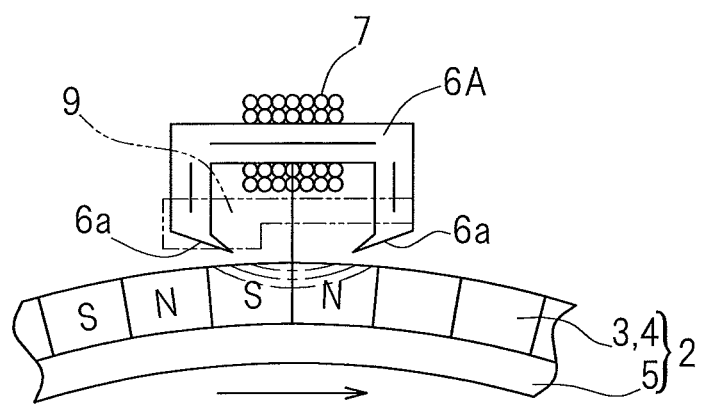
FIG. 15 is a front view showing a schematic configuration of a magnetization device for a magnetic encoder according to a sixth embodiment of the present invention.
Figure 16A:
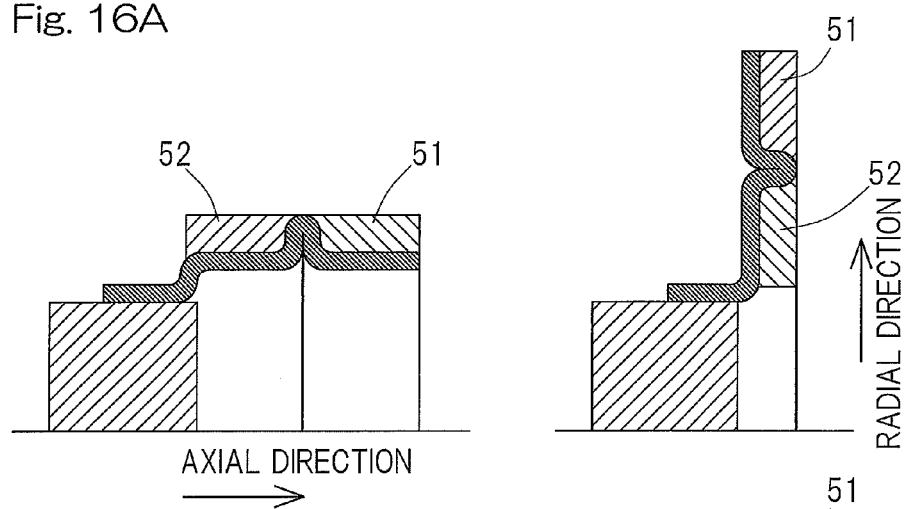
FIG. 16A is a cross-sectional view showing an example of a magnetic encoder including two rows of magnetic encoder tracks integrated therewith.
Figure 16B:
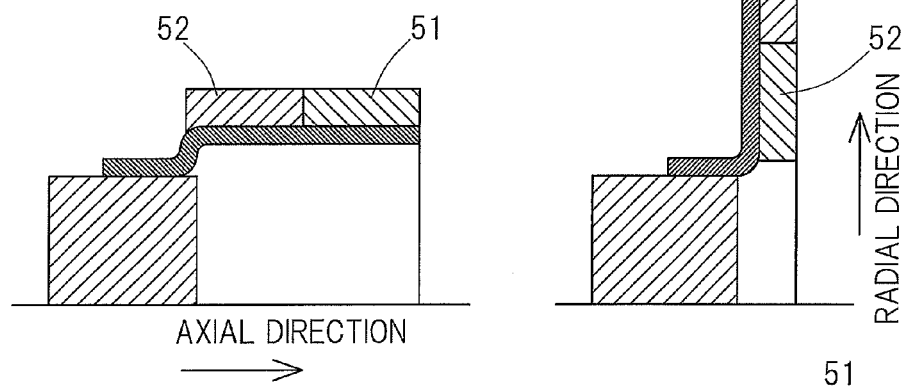
FIG. 16B is a cross-sectional view showing another example of the magnetic encoder including two rows of magnetic encoder tracks integrated therewith.
Figure 16C:
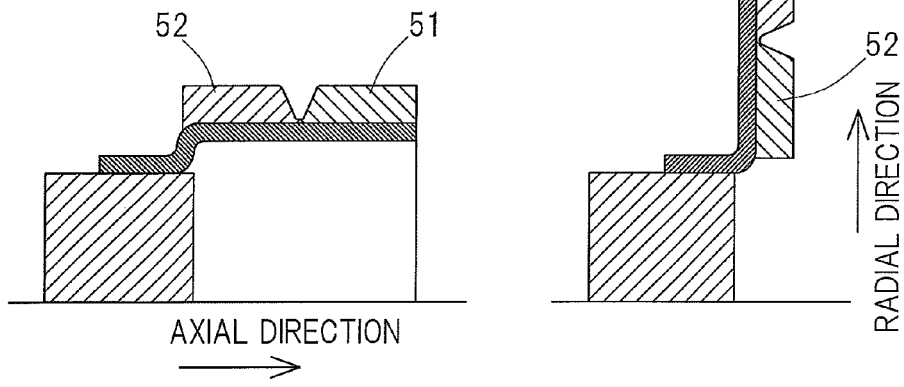
FIG. 16C is a cross-sectional view showing still another example of the magnetic encoder including two rows of magnetic encoder tracks integrated therewith.
Figure 17A:
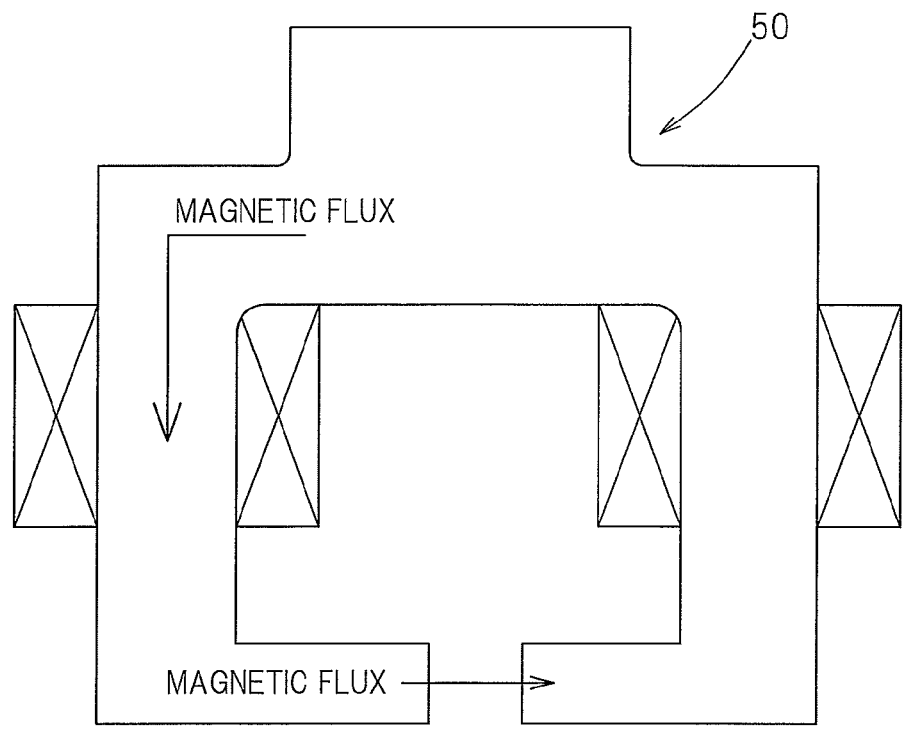
FIG. 17A is a side view showing a schematic configuration of a conventional magnetization device.
Figure 17B:
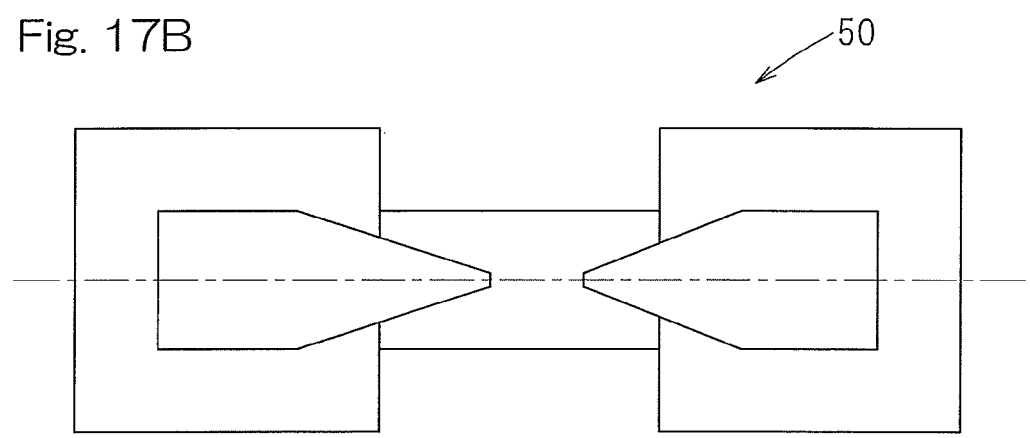
FIG. 17B is a bottom view of a principal part in FIG. 17A.
Figure 18A:
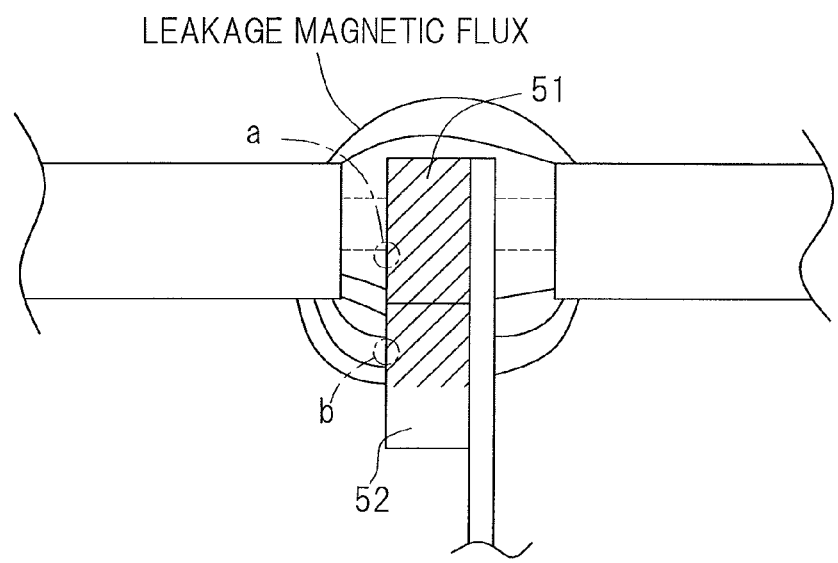
FIG. 18A is a side view showing an example of a conventional method for magnetizing a magnetic encoder.
Figure 18B:
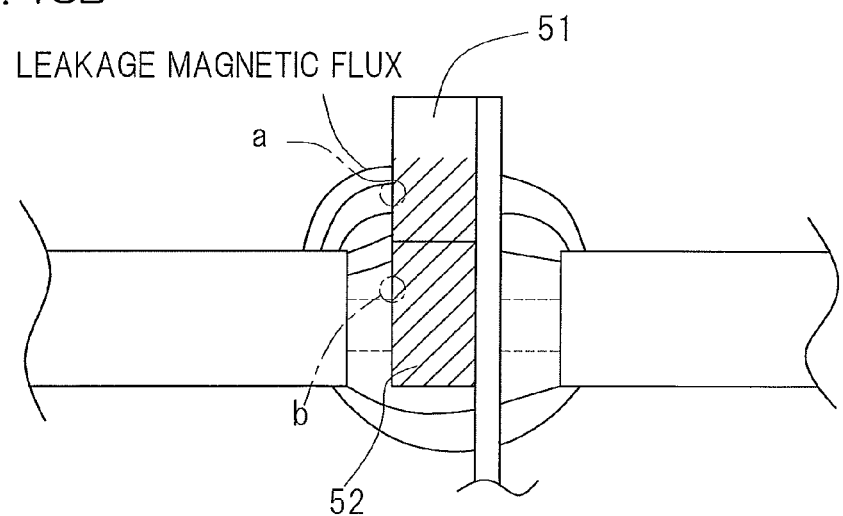
FIG. 18B is a side view showing another example of the conventional method for magnetizing a magnetic encoder.
Figure 19:
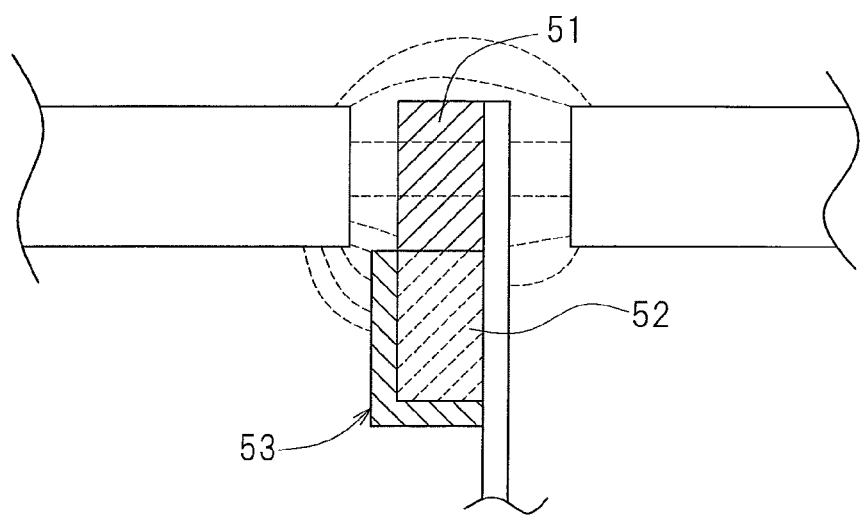
FIG. 19 is a side view showing a conventional method for magnetizing a magnetic encoder using a magnetic ring.

The magnetization device including a so-called penetration type magnetizing yoke has been shown in each embodiment described above. However, as in a sixth embodiment shown in FIG. 15, any of the magnetic shields 9 described above may be applied to a magnetization device including a surface type magnetizing yoke 6A. In any of the embodiments described above, a plurality of pairs of opposed end portions of the magnetizing yoke may be provided, and each pair of opposed end portions may be arranged offset in accordance with the arrangement positions of the plural rows of magnetic encoder tracks. For example, in the case of the axial type magnetic encoder, each pair of opposed end portions are arranged offset in the radial direction thereof. In the case of the radial type magnetic encoder, each pair of opposed end portions are arranged offset in the axial direction thereof. In this case, a magnetic sensor which detects a magnetization intensity of each magnetized magnetic pole may be provided in an empty space. A magnetization intensity can be detected by the magnetic sensor, thereby confirming the quality of the magnetic encoder.

The plural rows of un-magnetized magnetic encoder tracks may be simultaneously magnetized. In this case, it is possible to form a plurality of magnetic encoder tracks in a time taken for a single magnetization, and thus it is possible to make the magnetization time shorter than that when magnetization is performed per each row. The plural rows of magnetic encoder tracks may be arranged in a direction tilted relative to the axial direction of the rotation axis of the magnetic encoder. In the case where the plural rows of magnetic encoder tracks which are tilted as described above are incorporated into a bearing device for a wheel, it is possible to shorten the axial length of the entire bearing device for the wheel, and thus it is possible to make the device compact.

Although the preferred embodiments and application embodiments have been described with reference to the accompanying drawings as presented above, those skilled in the art will readily conceive numerous changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

1 . . . magnetization device
2 . . . annular magnetic body
3, 4 . . . magnetic encoder track
5 . . . core member
6 . . . magnetizing yoke
7 . . . exciting coil
8 . . . magnetization power source
9 . . . magnetic shield
11 . . . magnetic shield portion
15 . . . gap adjustment mechanism
ME . . . magnetic encoder

What is claimed is:

1. A magnetization device for a magnetic encoder, in which while an annular magnetic body including plural rows of annular un-magnetized magnetic encoder tracks which are arranged adjacent to each other and integrated therewith is rotated, portions of each magnetic encoder track in a circumferential direction thereof are magnetized one by one, thereby providing the magnetic encoder in which magnetic patterns different from each other are formed in the respective magnetic encoder tracks, the magnetization device comprising:

a magnetizing yoke including a pair of opposed end portions magnetically opposed to each other across a magnetic gap, the magnetizing yoke being configured to magnetize the magnetic encoder track of the magnetic encoder which magnetic encoder track is disposed at a determined position and in a determined attitude with respect to these opposed end portions;

an exciting coil wound on the magnetizing yoke and configured to pass magnetic flux between the opposed end portions when power is supplied thereto; and a magnetic shield provided to the magnetizing yoke and configured to shield flow of the magnetic flux to the rows of magnetic encoder tracks other than a magnetization target.

2. The magnetization device for the magnetic encoder as claimed in claim 1, wherein the pair of opposed end portions of the magnetizing yoke are arranged so as to confront to each other, and the magnetizing yoke causes the magnetic flux to pass through the magnetic encoder track, thereby magnetizing the magnetic encoder track.

3. The magnetization device for the magnetic encoder as claimed in claim 1, wherein the magnetic shield includes:

a magnetic shield portion arranged adjacent to either one of the opposed end portions of the magnetizing yoke in an arrangement direction of the plural rows of magnetic encoder tracks of the magnetic encoder; and a magnetic path formation portion configured to cause the magnetic flux flowing through the magnetic shield portion and the one of the opposed end portions adjacent to the magnetic shield portion to flow to a portion of the magnetizing yoke which portion has magnetic pole polarity which is the same as that of the other of the opposed end portions, or to flow to a core member if the magnetic encoder includes the core member.

4. The magnetization device for the magnetic encoder as claimed in claim 3, wherein the magnetic shield portion is provided at each of both sides, in the arrangement direction of the plural rows of magnetic encoder tracks, of the one of the opposed end portions of the magnetizing yoke.

5. The magnetization device for the magnetic encoder as claimed in claim 3, wherein the magnetic shield is attached to the portion of the magnetizing yoke which portion has the magnetic pole polarity identical with that of the other of the opposed end portions.

6. The magnetization device for the magnetic encoder as claimed in claim 3, wherein a gap between the magnetic shield portion and the one of the opposed end portions of the magnetizing yoke is not smaller than 0.5 mm and not larger than 3 mm.

7. The magnetization device for the magnetic encoder as claimed in claim 3, wherein a gap adjustment mechanism configured to adjust a gap between the magnetic shield portion and the one of the opposed end portions of the magnetizing yoke is provided.

8. The magnetization device for the magnetic encoder as claimed in claim 3, wherein the magnetic shield includes a plurality of magnetic shield portions.

9. The magnetization device for the magnetic encoder as claimed in claim 3, wherein the magnetic shield portion is formed such that a cross section of the magnetic shield portion taken along a plane including a rotation axis of the annular magnetic body has a rectangular plate shape, an L shape, or a circular arc shape.

10. The magnetization device for the magnetic encoder as claimed in claim 3, wherein the magnetic shield portion is attached to the magnetizing yoke via a non-magnetic body formed of a non-magnetic material.

* * * * *